US008924712B2

(12) United States Patent
Varadarajan et al.

(10) Patent No.: US 8,924,712 B2
(45) Date of Patent: Dec. 30, 2014

(54) USING QR CODES FOR AUTHENTICATING USERS TO ATMS AND OTHER SECURE MACHINES FOR CARDLESS TRANSACTIONS

(75) Inventors: Rammohan Varadarajan, Sunnyvale, CA (US); Ambarish Malpani, Palo Alto, CA (US)

(73) Assignee: CA, Inc., Islandia, NY (US)

( * ) Notice: Subject to any disclaimer, the term of this patent is extended or adjusted under 35 U.S.C. 154(b) by 83 days.

(21) Appl. No.: 13/597,697

(22) Filed: Aug. 29, 2012

(65) Prior Publication Data

US 2013/0124855 A1    May 16, 2013

Related U.S. Application Data

(60) Provisional application No. 61/559,635, filed on Nov. 14, 2011.

(51) Int. Cl.

| H04L 29/06 | (2006.01) |
|---|---|
| G06F 21/31 | (2013.01) |
| G06Q 20/32 | (2012.01) |
| H04L 9/32 | (2006.01) |
| G07F 19/00 | (2006.01) |
| G06Q 20/40 | (2012.01) |

(52) U.S. Cl.
CPC ............ *G06F 21/31* (2013.01); *G06Q 20/3276* (2013.01); *H04L 9/3234* (2013.01); *H04L 9/3228* (2013.01); *G07F 19/20* (2013.01); *G06Q 20/40* (2013.01); *H04L 2209/56* (2013.01); *H04L 2209/80* (2013.01)
USPC ........................................................ 713/155

(58) Field of Classification Search
CPC ....................... G06Q 20/3274; G06Q 20/3278
USPC .......................................................... 713/155
See application file for complete search history.

(56) References Cited

U.S. PATENT DOCUMENTS

| 6,170,058 | B1 * | 1/2001 | Kausik .......................... 713/193 |
|---|---|---|---|
| 2004/0003250 | A1 * | 1/2004 | Kindberg et al. ............. 713/171 |
| 2005/0187873 | A1 * | 8/2005 | Labrou et al. .................. 705/40 |
| 2005/0222961 | A1 * | 10/2005 | Staib et al. ..................... 705/64 |
| 2010/0070759 | A1 * | 3/2010 | Cobos et al. .................. 713/155 |
| 2011/0258058 | A1 * | 10/2011 | Carroll et al. ................... 705/15 |
| 2012/0160912 | A1 * | 6/2012 | Laracey ....................... 235/379 |
| 2012/0265679 | A1 * | 10/2012 | Calman et al. .................. 705/43 |
| 2013/0124855 | A1 * | 5/2013 | Varadarajan et al. ......... 713/155 |

OTHER PUBLICATIONS

Multimedia and Ubiquitous Engineering, 2009. MUE '09. Third International Conference on, Issue Date: Jun. 4-6, 2009, Written by: Gao, J.; Kulkarni, V.; Ranavat, H.; Lee Chang; Hsing Mei.*
Computer Software and Applications Conference, 2007. COMPSAC 2007. 31st Annual International, Issue Date: Jul. 24-27, 2007, Written by: Gao, J.Z.; Prakash, L.; Jagatesan, R.*

* cited by examiner

*Primary Examiner* — Harris Wang
(74) *Attorney, Agent, or Firm* — Baker Botts L.L.P.

(57) ABSTRACT

Systems, apparatus, methods, and computer program products for using quick response (QR) codes for authenticating users to ATMs and other secure machines for cardless transactions are disclosed. Embodiments of the present disclosure read an image displayed on a display of an external device using a mobile device associated with a user authorized to access a secure resource, decode transaction information encoded in the image, transmit the transaction information and an identifier of the mobile device from the mobile device to an authentication system, and grant access to the secure resource if the transaction information and the identifier satisfy an authentication test performed at the authentication system.

18 Claims, 5 Drawing Sheets

USING QR CODES FOR AUTHENTICATING USERS TO ATMS AND OTHER SECURE MACHINES FOR CARDLESS TRANSACTIONS

CROSS-REFERENCE TO RELATED APPLICATIONS

The present application claims the benefit of U.S. Provisional Application No. 61/559,635, filed Nov. 14, 2011, the entire disclosure of which is hereby incorporated by reference as if set forth herein.

BACKGROUND

The present disclosure generally relates to securing secure resources. The disclosed embodiments relate more specifically to systems, apparatus, methods, and computer program products for using quick response (QR) codes for authenticating users to ATMs and other secure machines for cardless transactions.

An increasing number of people engage in electronic transactions, telephone transactions, and other types of transactions in which at least one of the parties to the transaction relies on funds or other types of value to be provided or distributed by an entity other than that party. For example, an individual engaged in a purchase transaction with a merchant may rely on their banking institution to provide funds to the merchant through a bank or credit account held by the banking institution for the individual. In those types of transactions, it often is desirable to authenticate the identity of the party (e.g., the individual) to reduce the risk of unauthorized transactions.

Various techniques for authenticating the identity of a party engaged in a transaction generally include soliciting the party for a user-associated password, where the party previously has registered the user-associated password with an authenticating agent. For example, the user-associated password may be a personal identification number (PIN) registered by the party at the banking institution at which the party holds funds. That type of PIN often is entered at and passed through a merchant during a transaction. As another example, the user-associated password may be a password that is solicited by an account issuer and which, during a transaction with a merchant, is communicated to the account issuer while bypassing the merchant (e.g., a one-time password (OTP)).

While the use of user-associated passwords increases the integrity of transactions, problems with engaging in secure transactions still widely persist. For example, if an unauthorized third party gains access to the user-associated password of another, that third party may use that user-associated password to engage in unauthorized transactions by posing as the party that registered the user-associated password.

One method of authentication that secure systems (e.g., online bank interfaces, retail websites, Customer Relationship Management (CRM) portals, etc.) use is to solicit a user name/password combination from a user. Ease of use, convenience, and the familiarity of most users are the main reasons why that mode of authentication is so widely adopted. Such static password-based authentication, however, has many weaknesses. For example, user-chosen passwords tend to be weak and guessable, users tend to use the same password on multiple systems, and static passwords are vulnerable to phishing and eavesdropping.

Humans, in general, don't have great memories. They frequently choose passwords that are meaningful to them and relatively simple to guess. According to at least one study, the two most commonly used passwords are the number sequence "123456" and the word "password." The common use of such simple passwords makes attacking accounts relatively easy because hackers often can guess those passwords without having to go through all the combinations of potential passwords.

Further, people tend to use the same password on multiple systems. Thus, if one of the systems is compromised and a person's password is obtained from that system, that person's accounts on multiple systems can be broken into with that password. Moreover, since static passwords do not change, they are easy to phish/eavesdrop. If a user gets fooled by a phishing attack, he/she will end up disclosing his/her password to the fraudster. A person also may inadvertently disclose his/her password by transmitting the password over a non-protected channel on which a fraudster may eavesdrop.

In response to the foregoing problems, and in response to market demand, some websites hosting sensitive, high-value data have started offering two-factor authentication for certain accounts. Two-factor authentication requires the presentation of a first factor defined by something the user knows (e.g., a password, a personal identification number (PIN), etc.) in combination with at least a one other factor, such as something the user has (e.g., a smart card, a hardware token, etc.) and/or something the user is (e.g., a biometric characteristic). That strong authentication option, however, generally is made available only to commercial accounts or high net-worth individuals and is seldom granted to retail end-users. The availability of that option is limited by the websites to keep their operational costs down. Two-factor credentials are more expensive, require end-user training, and require more sophisticated support processes.

Two-factor credentials using hardware tokens, which are a commonly deployed type of two-factor credentials, are more expensive because of the additional hardware costs. Larger deployments also have to factor in the increased costs associated with inventory management, shipment, and replacement. Another reason for the lack of adoption of two-factor credentials on a large scale is the inconvenience associated with using them. For example, a user must have his/her hardware token in his/her physical possession in order to authenticate himself/herself, which is an unacceptable requirement in this age of near ubiquitous Internet access. Moreover, if the hardware token is lost, the user is locked out of the corresponding system until a replacement device is shipped to him/her. The use of two-factor credentials also requires an additional PIN, which users frequently forget or use in the incorrect order. Dealing with such scenarios requires more support processes than just resetting a user's password.

Piggybacking on the recent trend of mobile device usage, some security vendors have started supporting software-based tokens. While that reduced some of the overhead associated with hardware tokens (e.g., inventory management, shipment, replacement, etc.), the complexity of using an OTP was still the same as before. Moreover, such software-based tokens are vulnerable to clone attacks. While the hardware-based tokens used a seed key protected in hardware to generate OTPs, software-based tokens use seed keys kept on the file system of a mobile device to generate OTPs, which makes them vulnerable to cloning attacks. In such attacks, the seed keys may be copied from the mobile device by an attacker by attaching the mobile device to the attacker's computer and/or by placing a virus on the mobile device.

BRIEF SUMMARY

The present disclosure is directed to systems, apparatus, methods, and computer program products for using QR codes to authenticate users to ATMs and other secure machines for cardless transactions. Embodiments of the present disclosure read an image displayed on a display of an external device using a mobile device associated with a user authorized to access a secure resource, decode transaction information encoded in the image, transmit the transaction information and an identifier of the mobile device from the mobile device to an authentication system, and grant access to the secure resource if the transaction information and the identifier satisfy an authentication test performed at the authentication system.

BRIEF DESCRIPTION OF THE DRAWINGS

Aspects of the present disclosure are illustrated by way of example and are not limited by the accompanying figures with like references indicating like elements.

In those figures, like reference numerals refer to like parts, components, structures, and/or processes.

DETAILED DESCRIPTION

Figure 1:
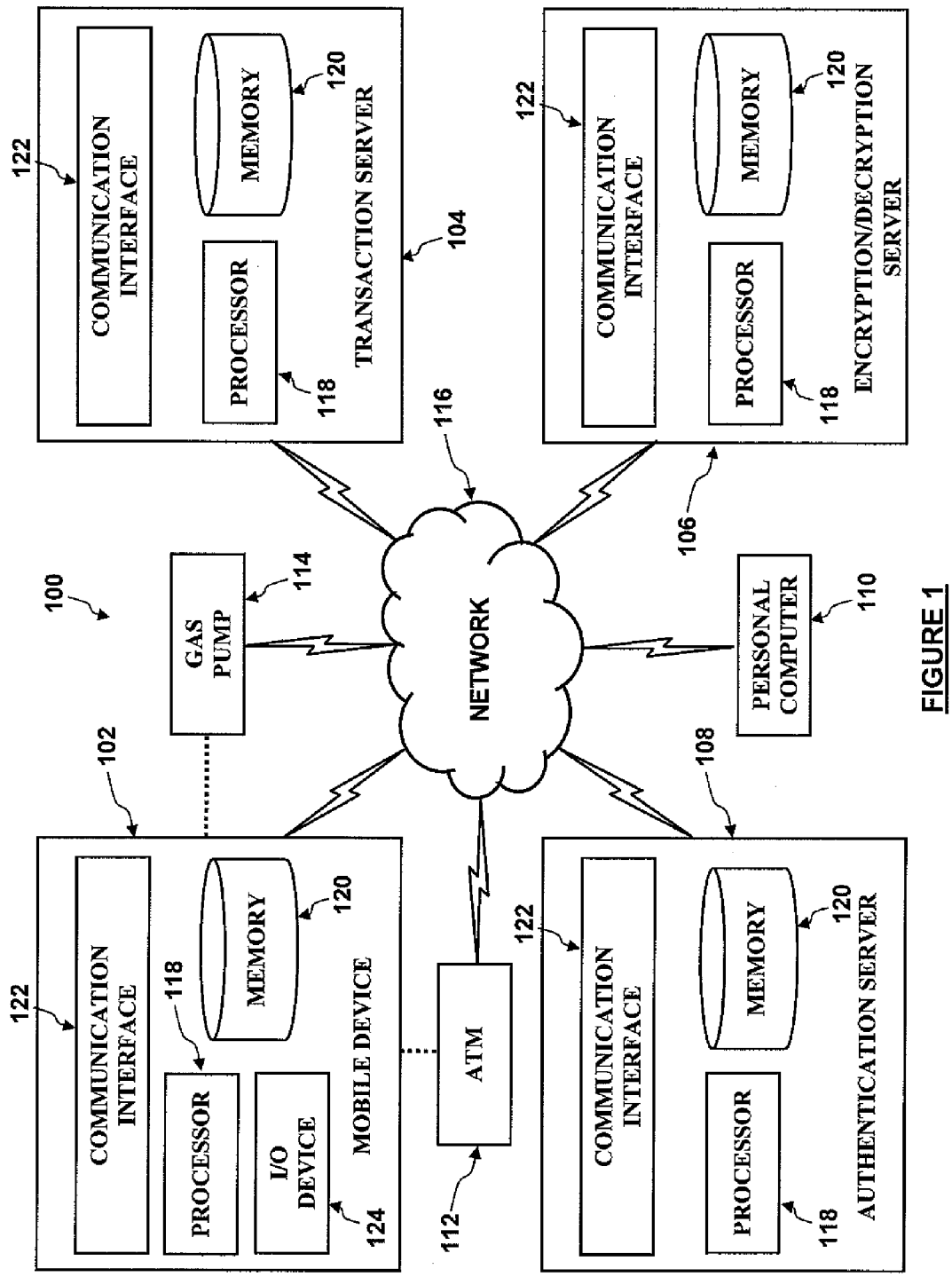
FIG. 1 is a block diagram illustrating a communication system according to embodiments of the present disclosure.

As will be understood by those of ordinary skill in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy; or other programming languages. The program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Embodiments of the present invention overcome some or all of the aforementioned deficiencies in the related art. According to some embodiments, methods, apparatuses, and systems for authentications are provided that have two-factor authentication using mobile devices and QR codes. Users can easily login to their retail, banking or other sensitive accounts by just scanning a QR code displayed on the login page of these websites using their 10 mobile phone. By marrying the security of a two factor credential on a mobile device with the convenience and user-friendliness of scanning a QR code, this approach reduces the barriers to the adoption of multi-factor credentials.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

Turning to the drawings, FIG. 1 illustrates a communications network 100 according to embodiments of the present disclosure. The communications network 100 comprises a mobile device 102, a transaction server 104, an encryption/decryption server 106, an authentication server 108, a personal computer 110, an automatic teller machine (ATM) 112, and a gas pump 114. Those network devices 102-114 are configured to communicate with each other via a network connection 116. The network connection 116 may be any suitable wired or wireless connection that supports such communications, including a cellular network connection (e.g., a Global System for Mobile Communications (GSM) connection, a Code Division Multiple Access (CDMA) connection, a Long Term Evolution (LTE) connection, etc.), a LAN connection, a wireless LAN (WLAN) connection, a WAN connection, or a combination of two or more of those network connections. Further, the mobile device 102 also may communicate at least with the personal computer 110, the ATM 112, and the gas pump 114 via a proximity-based wireless connection (e.g., a Near Field Communication (NFC) connection, a BLUETOOTH brand proximity-based wireless connection, etc.).

The mobile device 102 may be any portable computing device (e.g., a tablet computer, a smart phone, a personal digital assistant (PDA), etc) that is configured to communicate with the other network devices 104-114 within the communications network 100. The transaction server 104 may be any computing system (e.g., a computer hardware system, a computer program, etc.) that is configured to conduct electronic transactions within the communications network 100. The encryption/decryption server 106 may be any computing system (e.g., a computer hardware system, a computer program, etc.) that is configured to encrypt and decrypt messages transmitted across the communications network 100. And the authentication server 106 may be any computing system (e.g., a computer hardware system, a computer program, etc.) that is configured to authenticate an entity attempting to access the communications network 100 or any of the network devices 102-114 therein. Although depicted as separate network devices in FIG. 1, the transaction server 104, encryption/decryption server 106, and authentication server 108 may be provided as components of any number of devices. For example, the transaction server 104, encryption/decryption server 106, and authentication server 108 all may be components of a single device (e.g., a web server).

The personal computer 110 may comprise any general purpose computing device (e.g., a desktop computer, a laptop computer, etc.) that is configured to communicate with the other network devices 104-108, 112, and 114 within the communications network 100. The ATM 112 may be any suitable device that is configured to dispense currency and communicate with at least a transaction server 104 maintained by a financial institution (e.g., a bank, a credit card company, etc.). And the gas pump 114 may be any suitable device that is configured to dispense fuel and communicate with at least a transaction server 104 maintained by a merchant (e.g., a gas station, a credit card company, etc.). The personal computer 110, ATM 112, and gas pump 114 also may be configured to communicate with the mobile device 102 via a proximity-based wireless connection.

As FIG. 1 also illustrates, the mobile device 102, transaction server 104, encryption/decryption server 106, and authentication server 108 each comprise a processor 118, a memory 120, and a connection interface 122. The mobile device 102 also comprises an input/output (I/O) device 124. Although none of those elements 118-124 is illustrated with respect to the personal computer 110, ATM 112, or gas pump 114, it should be understood that those other network device 110-114 also may comprise any combination of those elements 118-124. Moreover, it should be understood that the transaction server 104, encryption/decryption server 106, and authentication server 108 also may comprise an I/O device 124. And although FIG. 1 only illustrates one (1) mobile device 102, one (1) transaction server 104, one (1) encryption/decryption server 106, one (1) authentication server 108, one (1) personal computer 110, one (1) ATM 112, and one (1) gas pump 114, the communications network 100 may comprise any number of each of those network devices 102-114, as well as other network devices (e.g., a cash register, a web server, etc.).

The processor 118 may comprise any number of suitable CPUs that are configured to execute the computer program code embodied on the memory 120 and to perform the various functions of the correspond network device 102, 104, 106, 108, 110, 112, 114, or 116. The memory 120 may comprise one or more types of memory (e.g., ROM, RAM, EEPROM, etc.) as required to store the computer program code executed by the processor 118 and to support the execution of that code. For example, the memory 120 may store the computer program code that is executed by the processor 118 to provide the functionality of the mobile device 102, as described in more detail below.

The communication interface 122 may comprise any number of suitable wired, wireless, and/or contactless interfaces that is configured to provide an data link between any one of the network devices 102-114 and any other of the network devices 102-114 as required to facilitate electronic data communications between those network devices 102-114 via the network connection 112 and/or a proximity-based wireless connection (e.g., a modem, a Network Interface Card (NIC), etc.). And the I/O device 124 may comprise any number of suitable devices that are configured to receive input from a user (e.g., a keypad, a scanner, a camera, a microphone, etc.), any number of suitable devices that are configured to output data to a user in a meaningful manner (e.g., a display, a printer, a speaker, a tactile feedback, etc.), or any combination thereof (e.g., a touch screen, a data port, etc.).

Figure 2A:
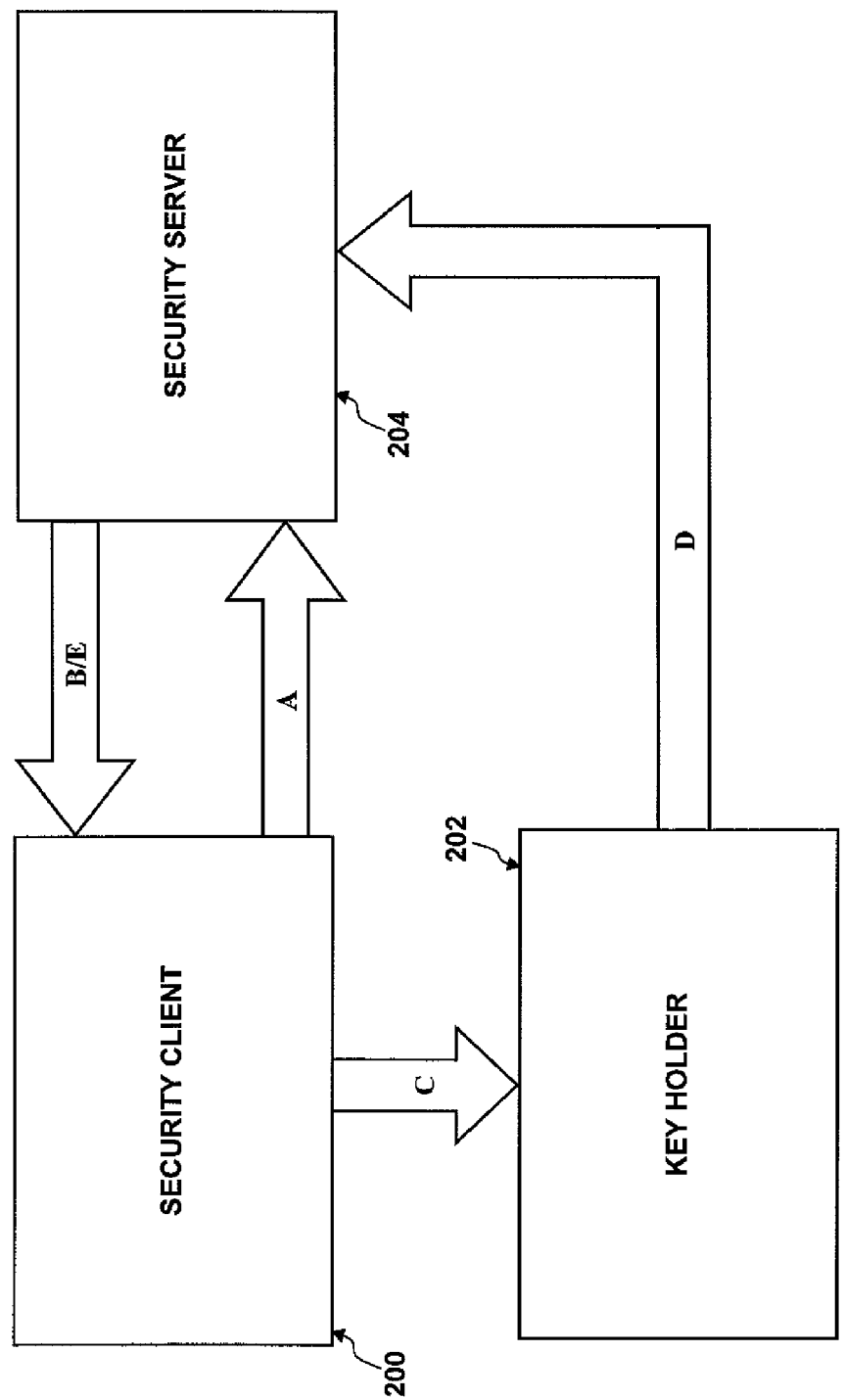
FIGS. 2A and 2B are block diagrams illustrating examples of elements and processes of the disclosed embodiments.
Figure 2B:
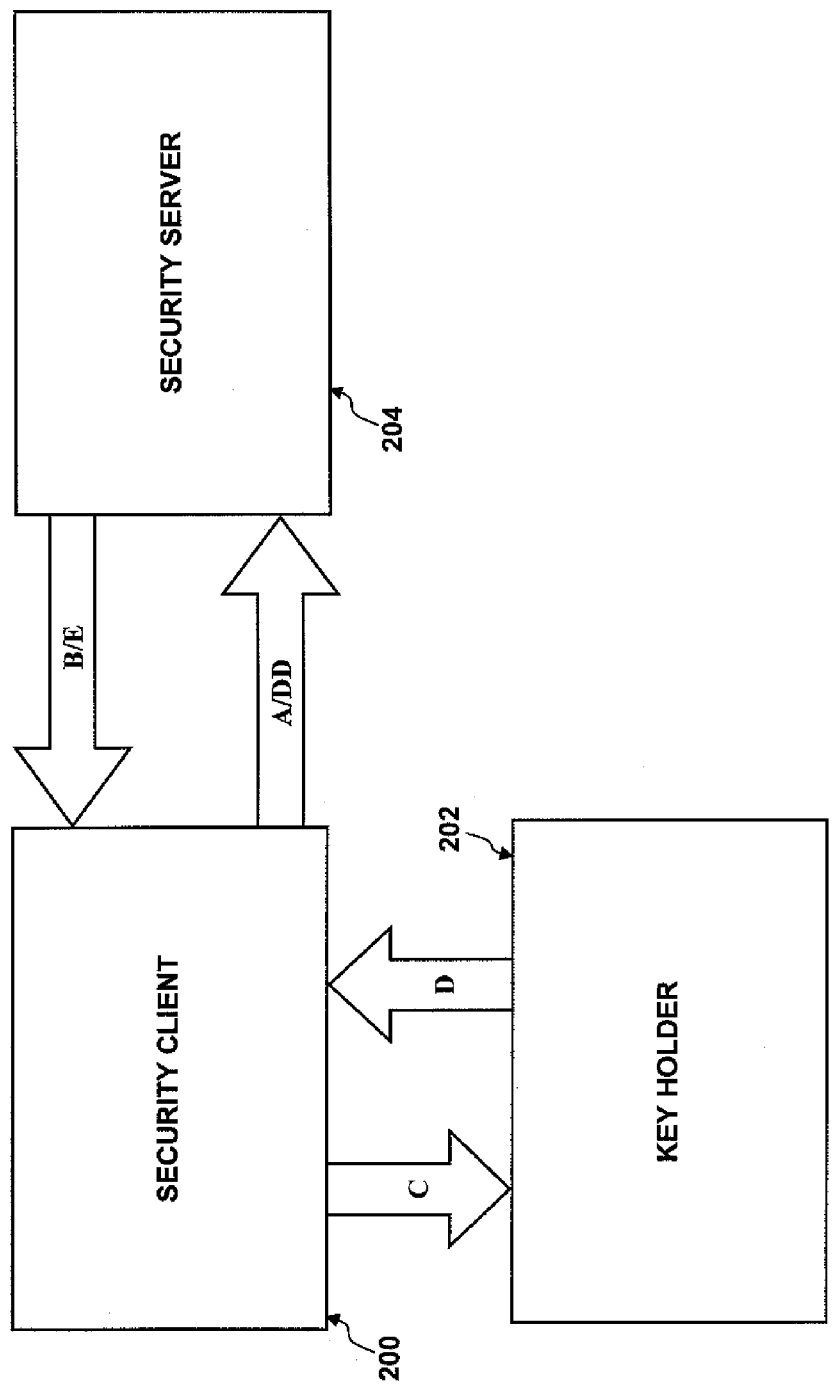

Turning to FIGS. 2A and 2B, elements and processes of the disclosed embodiments are illustrated. Those elements include a security client 200, a key holder 202, and a security server 202. The security client 200 is configured to receive transaction data from the authentication server 204 and determine the appropriate authentication data that must be returned to the authentication server 204 to authenticate the transaction defined by the transaction data. The security client 200 also is configured to transmit secret information to the key holder 202 in instances in which stronger authentication is required so that the appropriate authentication data may be obtained from the key holder 202. The key holder 202 is configured to store at least the seed keys utilized to generate a portion of the authentication data in a secure manner. And the security server 204 is configured to authenticate the transaction defined by the transaction data.

The security client 200 may be provided as part of a web browser on the personal computer 110, as part of ATM software at the ATM 112, or as part of gas station software at the gas pump 114 such that transactions conducted with those network devices 110-114 may be authenticated via communications with the key holder 202 and the security server 204. The key holder 202 may be provided as part of a mobile application on the mobile device 102 so that a user of the mobile device 102 may conveniently carry authentication information around with him/her and provide any inputs required to recover that authentication information via the I/O device 124 of the mobile device 102. And the security server 204 may comprise the transaction server 104, the encryption/decryption server 106, and the authentication server 108 so that the security server 204 may utilize the authentication information recovered from the key holder 202 to authenticate transactions conducted at the mobile device 102, the personal computer 110, the ATM 112, or the gas pump 114, as described in more detail below with respect to FIG. 4. And the authentication data recovered from the key holder 202 may either be transmitted to the security server 204 directly from the key holder 202 (FIG. 2A), or indirectly through the security client 200 (FIG. 2B), as also described in more detail below with respect to FIG. 4.

The key holder 202 may store seed keys in a secure manner utilizing key protection techniques, such as cryptographic camouflaging. Cryptographic camouflaging techniques may be used to encrypt seed keys in such a manner that any PIN or password entered recovers something that looks like a good key, such that an attacker who might have gained access to a user's seed key isn't able to mount a brute force offline attack on that key. For example, the attacker will be required verify whether a recovered seed key is correct by transmitting an OTP generated with that seed key back to the authentication server 106, which will prevent authentication for any incorrect seed key. Such cryptographic camouflaging techniques are disclosed, for example, in U.S. Pat. No. 6,170,058 to Kausik, the disclosure of which is hereby incorporated by reference as if fully set forth herein.

Cryptographic camouflaging makes it possible for users to authenticate transactions that require strong authentication utilizing four (4) to six (6) digit numeric PINs, which are relatively easy to remember and to input on mobile devices with small I/O devices 124 (e.g., small touch screens). Further, to protect against cloning, a DeviceID may be used in combination with a PIN to camouflage a seed key. The DeviceID is a key generated from various attributes of the mobile device 102. Thus, even when a user's PIN is obtained by an attacker, that attacker will not be able to unlock and extract the seed keys because it is virtually impossible to compute the DeviceID on any other device.

Embodiments of the present disclosure utilize such key protection techniques to facilitate the storage of seed keys in software, rather than in hardware, so as to reduce some of the overhead associated with hardware tokens (e.g., inventory management, shipment, replacement, etc.) while also providing protections against cloning attacks. Like the seed keys in hardware tokens, the seed keys stored in the key holder 202 may be utilized to provide the second factor in two-factor authentication by establishing the identify of a user based on what that user has in his/her possession—in particular, the mobile device 102 that comprises the key holder 202. In other words, the seed keys stored in the key holder 202 may be utilized to uniquely identify the mobile device 102. Moreover, rather than requiring the user to input any additional information into the mobile device 102 to generate and input an OTP, which may be tedious and introduce user error, embodiments of the present disclosure allow the user to automatically generate and input an OTP utilizing the mobile device 102.

As an example, a user may be required to input an OTP in addition to his/her user name and password when logging on to a particular web site, such as a bank web site that allows a user to access the account(s) he/she has with that bank. The web site may include transaction information that the user must copy from the web site and input into the mobile device 102 to generate the OTP. But rather than requiring the user to manually type that transaction information into the I/O device 124 (e.g., a keypad, a touch screen, etc.) of the mobile device 102, the user may scan or otherwise read that transaction information with the I/O device 124 (e.g., a scanner, a camera, etc.) of the mobile device 102. Accordingly, the transaction information is not limited to human-readable information (e.g., alpha-numeric text) and, instead, may be any of form machine-readable information (e.g., alpha-numeric text, an image, a bar code, a QR code, etc.).

Figure 3:
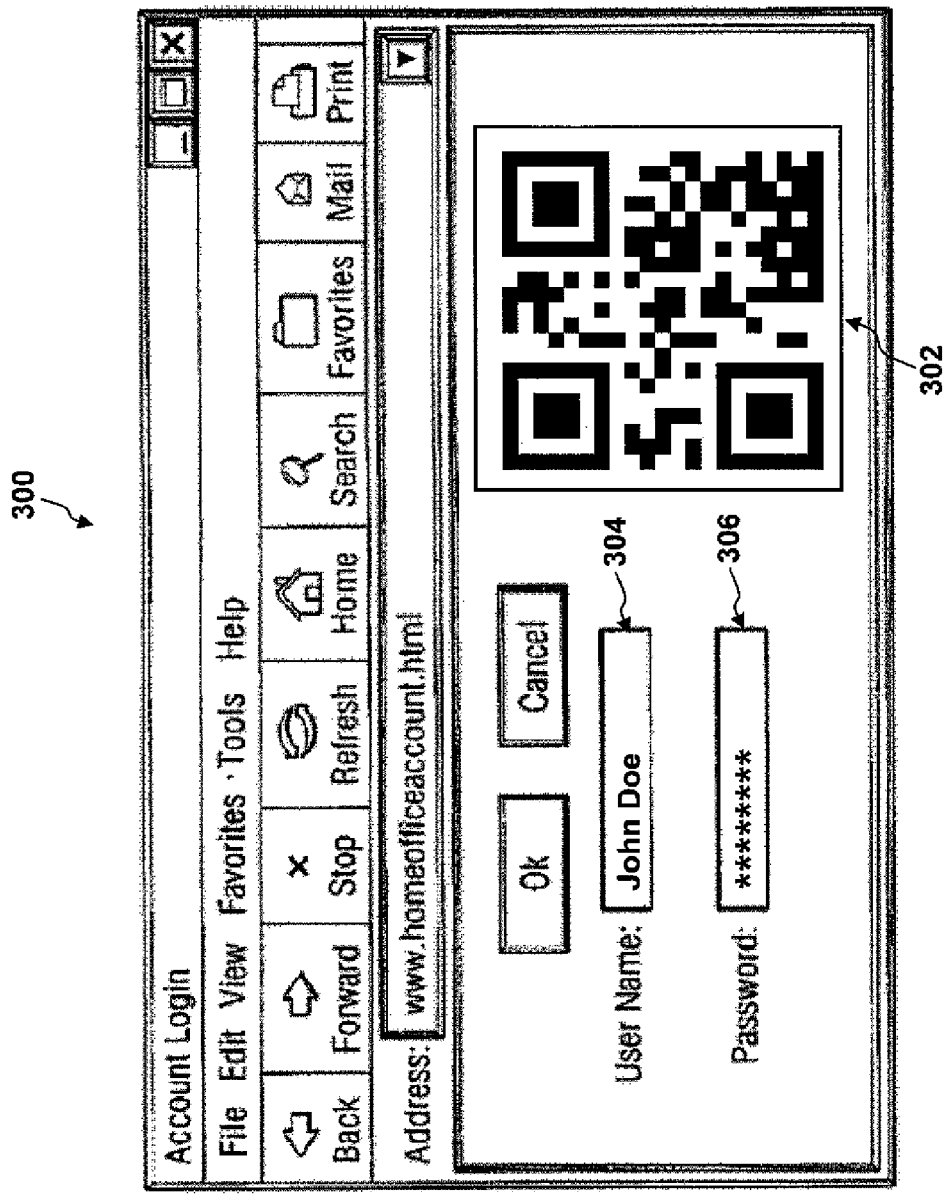
FIG. 3 is a screen capture of a consumer portal according to embodiments of the present disclosure.

Turning to FIG. 3, a consumer portal 300 is illustrated that comprises transaction information presented in the form of a QR code 302. The consumer portal 300 also comprises text boxes 304 and 306 where a user is prompted to input his/her user name and password, respectively. The QR code 302 may be generated based on the user name and password input into those text boxes 304 and 306, or it may be generated independently of that user information. The user then may utilize the I/O device 124 of his/her mobile device 102 to scan or otherwise read the QR code into his/her mobile device to generate an OTP. But rather than requiring the user to manually input the resulting OTP into the consumer portal 300, the mobile device 102 will automatically generate an OTP by recovering the seed key from the key holder 202 and utilizing that seed key to generate the OTP. Where stronger authentication is required, a challenged decoded from the QR code may be used in combination with the seed key to generated the OTP. A message comprising that OTP and the transaction information then may be transmitted automatically to the consumer portal 300 to complete authentication. Also where stronger authentication is required, a user may be prompted to input a PIN at the mobile device 102 to recover the seed key from the key holder 202, such as when cryptographic camouflaging techniques are utilized to store the seed key in the key holder 202.

In that example, the consumer portal 300 may be hosted on a web server that comprises the transaction server 104, the encryption/decryption server 106, and the authentication server 108. The transaction server 104 generates transaction information that determines the level of authentication required for a particular transaction and transmits that transaction information to the security client 200. The encryption/decryption server 106 decrypts that message and transmits the decrypted OTP and transaction information to the authentication server 108. And the authentication server 108 validates the OTP utilizing the transaction information that was presented in the QR code 302.

Using QR codes with cryptographic camouflaging techniques solves the last-mile problem by delivering a user-friendly two factor credential that is as secure as one delivered through a hardware token. QR codes simplify the user experience by just requiring users to point and scan in the QR code 302 with their mobile device 102 to complete a log in. If a password is required to recover a seed key from the key holder 202, that password may be entered at the mobile device 102. Because users may carry their mobile devices 102 wherever they go and it is easy to re-provision credentials when a mobile device 102 is lost or a password is forgotten, embodiments of the present disclosure also address availability problems.

Figure 4:
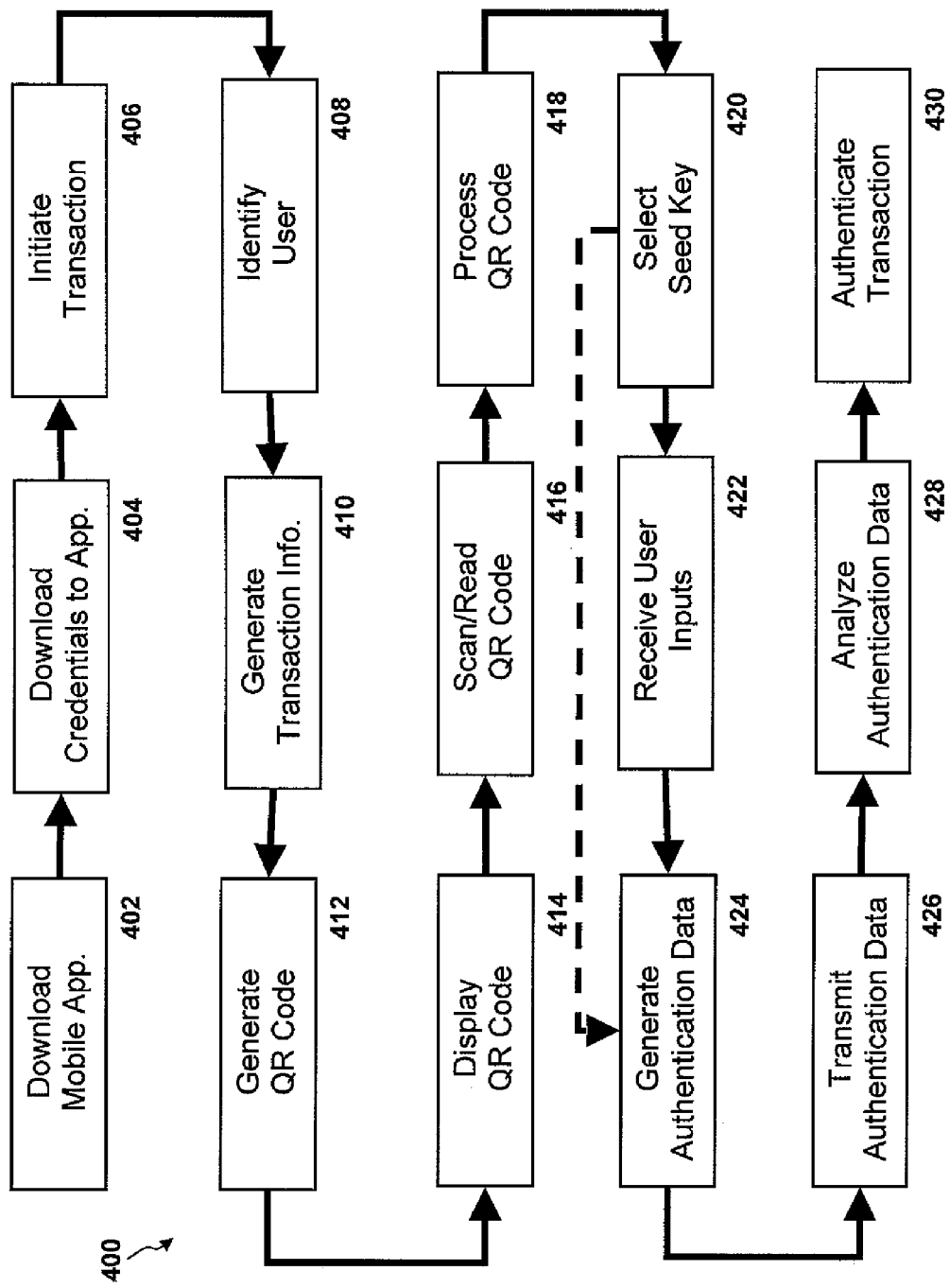
FIG. 4 is a flow chart illustrating an authentication process according to embodiments of the present disclosure.

Turning to FIG. 4, an authentication process 400 is illustrated that may be employed by embodiments of the present disclosure. At step 402, the user downloads a mobile application to his/her mobile device 102 from a public marketplace or an enterprise-specific download area, such as an appstore. The mobile application is stored on the memory 120 of the mobile device 102 and comprises the key holder 202 and functionality for decoding transaction information from the QR code 302 after the QR code 302 is scanned or otherwise read with the I/O device 124 of the mobile device 102. The mobile application also comprises functionality for prompting the user for his/her PIN, recovering a seed key from the key holder 202 with that PIN, utilizing that seed key to generate an OTP, utilizing the transaction information decoded from the QR code 302 to identify a challenge that may be utilized in OTP generation, and transmitting that OTP with the decoded transaction information to the security client 200 or the security server 204.

At step 404, the user's credentials are downloaded to the mobile application. Those credentials comprise user information, such as user names, seed keys, and an optional unique serial number. And those credentials may be downloaded in any number of ways, depending on an organization's particular needs. For example, a user may request that the organization's IT team send him/her the credentials using email, phone, or a self-service portal, wherein an email or a Short Message Service (SMS) message with a link to the credentials may be sent to that user's mobile device 102. When the user selects that link utilizing his/her mobile device 102, the credentials are downloaded and stored by the mobile application in the memory 124 of the mobile device 102.

As another example of step 404, the user may log in to a web site and have that web site send him/her an email or SMS message with the credentials. Similarly, the mobile application may contact such a web site and automatically download a unique serial number when the mobile application is started for the first time. The user then may associate his/her credentials with that unique serial number by logging in to the web site and adding the unique serial number to his/her profile, such that the unique serial number can be utilized to retrieve that user's credentials when they are needed.

As yet another example of step 404, the mobile application may generate a unique identifier after it is downloaded to the mobile device 102 and transmit that unique identifier to a web site provider via SMS message. The web site provider may maintain a telephone number associated with the mobile device 102 on file in an account profile for the user and look up that profile based on the telephone number. The application then may cause the mobile device 102 to initiate a connection with the web site to fetch the credentials associated with that profile. The credentials then are delivered to the mobile application for download when the mobile application provides the same unique identifier it used in the original SMS message.

At step 406, the user initiates a transaction at the personal computer 110, the ATM 112, the gas pump 114, or some other network device (not shown). For example, the user may initiate a transaction at the personal computer 110 by navigating to a consumer portal 300 with a web browser on the personal computer 110 or inputting his/her user name and password into the corresponding text boxes 304 and 306 in that consumer portal 300 with the personal computer 110; the user may initiate a transaction at the ATM 112 by inserting a bank card into a card reader at the ATM 112; and the user may initiate a transaction at the gas pump 114 by selecting a payment option at the gas pump 114. In the alternative or in addition to those manners of initiating a transaction, the user also may initiate a transaction at the personal computer 110, the ATM 112, or the gas pump 114 by placing the mobile device 102 in close proximity of any one of those network devices 110-114 such that a connection is established between the mobile device 102 and one of those other network devices 110, 112, or 114 via a proximity-based wireless connection (e.g., a NFC or BLUETOOTH brand proximity-based wireless connection).

At step 408, the user initiating the transaction at step 406 is identified with information that is unique to that user and/or his/her mobile device 102. For example, the user may be identified from the user name and password he/she inputs in the corresponding text boxes 304 and 306 of a consumer portal 300 (e.g., FIG. 3) using the personal computer 110; the user may be identified from the user information on the bank card inserted into the ATM 112; and/or the user may be identified from user information that may be read from the mobile device 102 when the mobile device 102 is placed in close proximity to the personal computer 110, the ATM 112, or the gas pump 114. That user information is transmitted from the security client 200 to the security server 204 in step 408, as depicted by the arrow in FIGS. 2A and 2B that includes reference character "A".

At step 410, the security server 204 utilizes the user information A it receives from the security client 200 at step 408 and generates transaction information for the transaction initiated by the user at step 406. The security server 204 utilizes the transaction server 104 to generate transaction information that includes a session identifier that identifies the log on session that requires authentication. And for transactions that require stronger authentication, that transaction information also may include a challenge to which the user must respond to authenticate the transaction. That transaction information is transmitted from the security server 202 to the security client 200 in step 410, as depicted by the arrow in FIGS. 2A and 2B that includes reference character "B".

At step 412, the security client 200 generates the QR code 302 utilizing the transaction information B received from the security server 204 at step 410. In the alternative, the security server 204 may generate the QR code 302 at step 410 before transmitting that transaction information B to the security client 200. In the latter instance, the transaction information B would be transmitted from the security server 204 to the security client 200 in step 412, rather than in step 410, and would include the QR code 302.

The QR code 302 generated at step 412 comprises the session identifier generated at step 410 and, if stronger authentication is required, the challenge generated at step 410. That transaction information is encoded in a two-dimensional digital image, or matrix barcode, that comprises a plurality of square dots arranged in a square pattern on a white background. The two-dimensional digital image further comprises three (3) distinctive squares at its corners and a smaller square near its fourth corner. Those squares are utilized to normalize the size, orientation, and angle of viewing of the two-dimensional digital image when the QR code 302 is processed read at step 418.

At step 414, the security client presents the QR code 302 to the user. The QR code 302 may be presented to a user at a display (not shown) at the personal computer 110, the ATM 112, or the gas pump 114. Because the QR code 302 is black and white in color, such a display need not be a color display. Moreover, the size of the QR code 302 is limited primarily by the resolution of the display and the resolution of the I/O device 124 used to scan or otherwise read the QR code 302. Thus, the display also need not be very large.

As should be understood, steps 406-414 may be performed without any user interaction, other than the user brining the mobile device 102 within close proximity of the personal computer 110, the ATM 112, or the gas pump 112. For example, as a user carries the mobile device 102 within close proximity of the ATM 112, a proximity-based wireless connection may be established between the mobile device 102 and the ATM 112. Although the user may be prompted by the mobile application to authorize that connection the first time the mobile device 102 is brought within close proximity of the ATM 112, all subsequent connections may be performed automatically based on that prior authorization. Thus, that connection may automatically initiate a transaction at step 406, user information A may automatically be transmitted to from the mobile device 102 to the security server 204 at step 408, transaction information B and the QR code 302 may automatically be generated and transmitted to the security client at steps 410 and 412, and the QR code 302 may automatically be displayed at the ATM 112 at step 414. Accordingly, the QR code 302 may be displayed to the user without the user providing any inputs when the user comes within close proximity of the ATM 112.

In the alternative, the user may be required to at least initiate the transaction at step 406, such as by inserting a bank card into a card reader at the ATM 112. The same is true for transactions conducted at the personal computer 110 and the gas pump 114. For example, steps 406-414 may be performed automatically without user input by brining the mobile device 102 in close proximity of the personal computer 110 or the gas pump 114; or the user may be required to at least initiate the transaction at step 406 by inputting a user name and password into the personal computer 110 or by selecting a payment option at the gas pump 114 at step 406. In either instance, however, steps 408-414 may be performed automatically in the background without user input.

At step 416, the user utilizes the I/O device 124 of the mobile device 102 to scan or otherwise read the QR code 302 that is presented to the user at step 414. For example, the I/O device 124 may comprise a digital charge-coupled device (CCD) image sensor or complementary metal-oxide-semiconductor (CMOS) image sensor that detects the two-dimensional digital image of the QR code 302 and converts it into an electronic signal. That electronic signal includes the transaction information encoded in the QR code 302. The mobile application then may process that electronic signal with the processor 118 of the mobile device 102 or transmit that electronic signal to an external server for processing via the communication interface 122 of the mobile device 102.

At step 418, the processor 118 of the mobile device 102 or the processor of an external server processes the electronic signal generated at step 416. For example, the processor 118 of the mobile device may locate the three (3) distinctive squares at the corners of the two-dimensional digital image of the QR code 302 and normalize the size, orientation, and angle of viewing of that image with the aid of the smaller square near the fourth corner. The data corresponding to the small black squares of the image then may be converted to binary numbers and validity checked with an error-correcting code. Those binary numbers then are used to decode the transaction information from the QR code 302.

The transaction information in the digital signal generated at step 416 and processed at step 418 is transmitted to the key holder 202 for use in recovering the appropriate seed key to authenticate the underlying transaction. The key holder 202 uses that transaction information in combination with some secret information to confirm that the security client 200 wishes to perform the underlying transaction. In some instances, the transaction information may not be used as part of the authentication process, but rather may provide information about the underlying transaction that must be verified. The transmission of that transaction information and secret information from the security client 200 to the key holder 202 is accomplished at steps 416 and 418 in FIG. 4, and is depicted by the arrow in FIGS. 2A and 2B that includes reference character "C".

At step 420, the key holder 202 selects the seed key required to generate the OTP for authenticating the underlying transaction based on the transaction information received at step 418. For transactions for which stronger authentication is not required, the key holder 202 may select a seed key that is stored without utilizing key protection techniques such that no additional input is required to recover that key. Such transactions may include those that involve the exchange of money less than or equal to a certain amount and/or with a trusted merchant, such as Quick Sale Retail (QSR) transactions. Transactions that involve the exchange of money greater than that amount and/or with a non-trusted merchant, on the other hand, may require stronger authentication due to the greater transaction costs with which such transactions are associated. Accordingly, the transaction information received by the key holder 202 may include the value of the money being exchanged and/or the identify of the merchant with whom that money is being exchanged, as well as any other information that may be pertinent to the level of authentication required and/or the key selected (e.g., user name, address, account number, credit card number, CVV value, etc.).

For transactions that require stronger authentication, the key holder 202 may select a seed key that is stored utilizing key protection techniques, such as cryptographic camouflaging. Key protection techniques are utilized to store those seed keys because they are used to authenticate transactions that are associated with greater transaction costs. Accordingly, those seed keys are afforded greater protection from attacks such as cloning. Moreover, the user may be prompted to input a PIN or some other information (e.g., password, answer to a security question, biometric data, etc.) at step 422 to recover the seed key, which also helps ensure that the user actually intends to conduct the underlying transaction. That PIN or other information may be required as part of the key protection technique, or it may be required in response to any challenge that may have been decoded from the QR code 302 at step 418. Nevertheless, step 422 may be skipped when user input is not required, as indicated by the dashed-line arrow between step 420 and step 424 in FIG. 4.

Although the foregoing embodiments are described in terms of seed keys that are protected with key protection techniques and seed keys that are not, in other embodiments all or none of the seed keys may be protected with key protection techniques. In the embodiments in which some or all of the seed keys are protected with key protection techniques, the mobile application may store and automatically retrieve any PIN or other information required by the key holder 202 to recover those seed keys such that no user input is required to recover those seed keys. Instead, additional security may be provided in those other embodiments via the challenge presented to the user, to which the user may be prompted to respond by providing input. As yet another alternative, the mobile application also may store and automatically retrieve any information that may be required in response to any challenge such that the user also is not required to provide any input in response to such a challenge.

At step 424, the key holder 202 recovers the seed key identified at step 420 and utilizes that seed key to generate an OTP. When a challenge is decoded from the QR code 302 at step 418, that challenge also may be utilized for OTP generation. The OTP then may be put in a message with the transaction information. As described above, that transaction information may comprise the session identifier generated at step 410 as well as a response to any challenge that may have been decoded from the QR code 302. The transaction information also may comprise user information (e.g., a user name, a user ID, etc.) that may be derived from the credentials downloaded by the mobile application at step 404.

At step 426, the signed message is transmitted from the key holder 202 to the security client 200 or the security server 204 as authentication information. The transmission of that authentication information is depicted by the arrow in FIGS. 2A and 2B that includes reference character "D". And when that authentication information is transmitted from the key holder 202 to the security client 200, rather than directly to the security server 204, the security client 200 will then relay that authentication information to the security server 204, as depicted by the arrow in FIG. 2B that includes reference character "DD". The authentication information D (FIG. 2A) may be transmitted directly to the security server 204 from the key holder 202 when the mobile device 102 is connected to the security server 204 (i.e., the transaction server 104, encryption/decryption server 106, and or authentication server 108); or the authentication information D and DD (FIG. 2B) may be transmitted to the security server 204 from the key holder 202 via the security client 200 when the mobile device 102 is connected to the security client 200 (i.e., the personal computer 110, the ATM 112, or the gas pump 114) but not to the security server 204. In either instance, those connections may be via the network connection 112, a proximity-based wireless connection, or a combination thereof.

At step 428, the security server 204 analyzes the authentication information D or DD that it receives at step 426. The encryption/decryption server 106 decrypts the authentication information D or DD. And the authentication server 108 utilizes the OTP and transaction information decrypted from the authentication information to validate the OTP utilizing that transaction information. And if the seed key utilized to generate that OTP was not the correct seed key, such as when an incorrect seed key is recovered from the key holder 202 with an incorrect PIN, the authentication process 300 will end at step 428 and the attempt to utilize that incorrect seed key will be flagged. Accordingly, possible attacks on a user's seed keys may be identified, such as if a predetermined number of successive attempts to authenticate a transaction fail.

Even if the correct seed key was utilized to generate the OTP at step 424, the authentication server 108 further validates the OTP by comparing it with the transaction information B and C that was utilized to generate that OTP, such as the session identifier, user information, and any response to any challenge decoded from the QR code 302. If the OTP was generated with the correct seed key and the OTP corresponds with the transaction information B and C, the authentication server 108 will determine that the authentication information D or DD received at step 426 is valid.

At step 430, the security server 204 transmits post-authentication information to the security client 200 if the authentication information D or DD received is determined to be valid at step 428. That post-identification data informs the security client (e.g., the web browser, ATM software, gas station software, etc.) that the user is authorized to log on so as to effectuate the user's log on and complete the authentication process 430. The transmission of that post-authentication information is depicted by the arrow in FIGS. 2A and 2B that includes reference character "E".

When the authentication information D transmitted directly to the security server 204 at step 426, as depicted in FIG. 2A, the security client 200 may determine that the transaction was successfully authenticated at step 428 by periodically poll the security server 204, by creating an outstanding request from the security client 200 to the security server 204 that is reopened as long as the security server 204 does not cancel it or send a result to the security client 200, and/or by having a push channel from the security server 204 to the security client 200. And when the authentication information DD is transmitted to the security server 204 via the security client 200, as depicted in FIG. 2B, the key holder 202 may prompt the security client 200 to start polling the security client 200 after it has transmitted the result to the security client 200 and/or the security client 200 has acknowledged that the transmission was successful.

As should be understood, steps 418-420 and 424-430 may be performed without any user interaction. And because steps 406-414 also may be performed without any user interaction and step 422 may be skipped when no user input is required to recover a seed key and/or authenticate a transaction, the only user interaction required to authenticate a transaction after the mobile application and user credentials are downloaded at steps 402 and 404, respectively, is that the user scan or otherwise read the QR code 302 with the I/O device 124 of the mobile device 102 at step 416. Thus, upon successful validation at step 430, the security client may log the user on to the personal computer 110, ATM 112, or gas pump 114 without any input from the user at those network devices 110-114. Even the user name and password may be automatically filled in, for example, in the corresponding text boxes 304 and 306 of the consumer portal 300 such that, at most, a user may be required to input a PIN or other information into the I/O device 124 of the mobile device 102 at step 422.

The QR code authentication of the disclosed embodiments enables the use of multi-factor credentials by a large user base without re-training users, enables customers to deploy and manage multi-factor credentials without significant overheads, offers protection against different types of attacks, such as cloning and skimming, and enables users to authenticate eCommerce transactions, which reduces the possibility of fraud. As demonstrated by the example of authenticating a transaction at the personal computer 110, any web application with sensitive, high value information may utilize the disclosed embodiments to enhance the security of their authentication process. To log in, the user visits the login page of the web application. That login page can be configured to allow regular user name/password authentication or strong authentication via QR codes. It is also possible to configure separate login pages for those credentials.

As demonstrated by the example of authenticating a transaction at the ATM 112, banks can protect their customers from card skimming attacks by offering QR code authentication at their ATMs. With the QR code mechanism, the user can enter the PIN on their mobile device 102, rather than on the ATM 112. When the user scans the QR code 302 with his/her mobile device, the signed transaction information is sent from the mobile application on the mobile device 102 to the security server 204 via the network connection 116 or, alternatively, to the ATM 112 using a proximity-based wireless connection. In the latter instance, the security client 200 on the ATM 112 then relays the signed transaction information to the security server 204 via the network connection 116.

And as demonstrated by the example of authenticating a transaction at the gas pump 114, gas stations also can protect their customers from card skimming attacks by offering QR code authentication at their gas pumps. The convenience and security of QR authentication is provided at the gas pump 114 in a similar manner to the ATM 112. Moreover, gas stations may enhance their loyalty card/marketing programs using the mobile application. For example, if the gas station has a convenience store on its premises, an electronic coupon can be sent to the user's mobile application via the connection established between the mobile device 102 and the gas pump 114.

Mobile devices 102 are a convenient mechanism for implementing the authentication techniques of the disclosed embodiments because they tend to be very personal devices (i.e., they not shared much) and are physically carried by users to most locations to which those users travel. And although the disclosed embodiments are described primarily in terms of using mobile devices 102 to conduct transactions at a personal computer 110, an ATM 112, and a gas pump 114, it should be understood that authentication also may be to a variety of other types of servers/peer to peer clients, such as web checkout/purchase pages. Moreover, the mobile application may include functionality that not only performs authentication for cardless transactions, it also may include functionality that performs as an eCommerce wallet for cardless transactions. For example, while most eCommerce transactions require the user to fill out the credit card information at checkout, the mobile application or a back end server could transmit user form data (e.g., address, credit card number, expiry, etc.) to the merchant when the mobile application authenticates the transaction with the QR code 302 such that the user doesn't need to fill out the credit card information. And since that transaction involves strong authentication, a case could be made that such a transaction should qualify for the Card-Present category of transactions, which have lower transaction costs than Card-Not-Present (CNP) transactions.

In addition, although the foregoing embodiments are described primarily in terms of authentication utilizing QR codes, it should be understood that other types of machine-readable information could be utilized instead of QR codes. For example, some other type of matrix bar code could be presented to the user, a Universal Product Code (UPC) type barcode could be presented to the user, or some other machine-readable image in which information may be encoded could be presented to the user.

The block diagrams and flow diagrams depicted in FIGS. 1-4 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. An apparatus for authenticating a transaction, the apparatus comprising:
a memory configured to store two or more seed keys;
a communication interface configured to facilitate communications between the apparatus and an authentication system;
an input device configured to read an image comprising a matrix barcode encoded with transaction information that is displayed on a display of an external device, the transaction information comprising at least one of a monetary value and an identity of a merchant associated with a transaction; and
a processor configured to:
recover a first seed key from the two or more seed keys stored on the memory if at least one of:
the monetary value associated with the transaction is greater than a predetermined amount, and
the identity of the merchant associated with the transaction does not correspond to a trusted merchant;
recover a second seed key from the two or more seed keys stored on the memory if at least one of:
the monetary value associated with the transaction is less than or equal to the predetermined amount, and
the identity of the merchant associated with the transaction corresponds to a trusted merchant; and
transmit a password generated with the recovered seed key to the authentication system via the communication interface.

2. The apparatus of claim 1, wherein the memory is configured to store the two or more seed keys in a secure manner utilizing a key protection technique.

3. The apparatus of claim 2, wherein:
the key protection technique comprises cryptographic camouflaging.

4. The apparatus of claim 1, wherein the key protection technique requires input in addition to the image read by the input device to recover the first seed key from the memory and does not require input in addition to the image read by the input device to recover the second seed key from the memory.

5. The apparatus of claim 1, wherein:
the communication interface is configured to facilitate communications between the apparatus and the external device when the apparatus is within close proximity of the external device; and
the communications between the apparatus and the external device are configured to cause the external device to display the image on its display based on those communications.

6. The apparatus of claim 1, wherein the processor is configured to decode the transaction information encoded in the image and to generate the password with the recovered seed key.

7. A method for authenticating a transaction comprising:
reading an image comprising a matrix barcode encoded with transaction information that is displayed on a display of an external device using a mobile device associated with a user authorized to access a secure resource, the transaction information comprising at least one of a monetary value and an identity of a merchant associated with a transaction;
recovering a first seed key from two or more seed keys stored on a memory of the mobile device if at least one of:
the monetary value associated with the transaction is greater than a predetermined amount, and
the identity of the merchant associated with the transaction does not correspond to a trusted merchant;
recovering a second seed key from the two or more seed keys stored on a memory of the mobile device if at least one of:
the monetary value associated with the transaction is less than or equal to the predetermined amount, and
the identity of the merchant associated with the transaction corresponds to a trusted merchant; and
transmitting a password generated with the recovered seed key from the mobile device to an authentication system.

8. The method of claim 7, further comprising storing the two or more seed keys on the memory of the mobile device in a secure manner utilizing a key protection technique.

9. The method of claim 8, wherein:
the key protection technique comprises cryptographic camouflaging.

10. The method of claim 7, further comprising:
requiring input into the mobile device to recover the first seed key from the memory of the mobile device;
recovering the first seed key from the memory of the mobile device when the required input is received; and
recovering an incorrect key from the memory of the mobile device when some other input is received.

11. The method of claim 7, further comprising:
establishing communications between the apparatus and the external device when the apparatus is within close proximity of the external device; and
causing the external device to display the image on its display based on those communications.

12. The method of claim 7, further comprising:
decoding the transaction information encoded in the image at the mobile device; and
generating the password at the mobile device with the recovered seed key.

13. A non-transitory computer program product comprising a computer-readable storage medium having computer-readable program code embodied therewith, the computer-readable program code being configured to be executed by an apparatus with a memory that stores two or more seed keys and comprising:
computer-readable program code configured to read an image comprising a matrix bar code encoded with transaction information that is displayed on a display of an external device, the transaction information comprising at least one of a monetary value and an identity of a merchant associated with a transaction;
computer-readable program code configured recover a first seed key from the two or more seed keys stored on the memory if at least one of:
the monetary value associated with the transaction is greater than a predetermined amount, and
the identity of the merchant associated with the transaction does not correspond to a trusted merchant;
computer-readable program code configured to recover a second seed key from the two or more seed keys stored on the memory if at least one of:
the monetary value associated with the transaction is less than or equal to the predetermined amount, and
the identity of the merchant associated with the transaction corresponds to a trusted merchant; and
computer-readable program code configured to transmit a password generated with the recovered seed key to an authentication system via the communication interface.

14. The non-transitory computer program product of claim 13, wherein the memory is configured to store the two or more seed keys in a secure manner utilizing a key protection technique.

15. The non-transitory computer program product of claim 14, wherein:
the key protection technique comprises cryptographic camouflaging.

16. The non-transitory computer program product of claim 13, further comprising:
computer-readable program code configured to require input into the apparatus to recover the first seed key from the memory;
computer-readable program code configured to recover the first seed key from the memory when the required input is received; and
computer-readable program code configured to recover an incorrect key from the memory when some other input is received.

17. The non-transitory computer program product of claim 13, further comprising:
computer-readable program code configured to establish communications between the apparatus and the external device when the apparatus is within close proximity of the external device; and
computer-readable program code configured to cause the external device to display the image on its display based on those communications.

18. The non-transitory computer program product of claim 13, further comprising:
computer-readable program code configured to decode the transaction information encoded in the image; and computer-readable program code configured to generate the password with the recovered seed key.

\* \* \* \* \*